United States Patent
Nodera et al.

(10) Patent No.: US 6,197,857 B1
(45) Date of Patent: Mar. 6, 2001

(54) FLAME-RETARDANT POLYCARBONATE RESIN COMPOSITION AND ITS MOLDINGS

(75) Inventors: Akio Nodera; Naoki Mitsuta; Noritada Takeuchi, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/433,210

(22) Filed: Nov. 4, 1999

(30) Foreign Application Priority Data

Nov. 12, 1998 (JP) .................................................. 10-322422

(51) Int. Cl.$^7$ ...................................................... C08K 5/52
(52) U.S. Cl. ......................... 524/141; 524/140; 524/143; 524/145; 524/267; 524/269
(58) Field of Search .................................. 524/141, 267, 524/269, 140, 143, 145

(56) References Cited

U.S. PATENT DOCUMENTS

| | | | |
|---|---|---|---|
| 5,449,710 | 9/1995 | Umeda et al. | 524/87 |
| 5,658,974 * | 8/1997 | Fuhr et al. | 524/127 |
| 5,837,757 | 11/1998 | Nodera et al. | 524/165 |
| 5,900,446 * | 5/1999 | Nishihara et al. | 524/127 |
| 6,071,992 * | 6/2000 | Okada et al. | 524/139 |

FOREIGN PATENT DOCUMENTS 520 186 * 12/1992 (EP) .

* cited by examiner

*Primary Examiner*—Margaret G. Moore
(74) *Attorney, Agent, or Firm*—Oblon, Spivak, McClelland, Maier, & Neustadt, P.C.

(57) ABSTRACT

An object of the invention is to provide a flame-retardant polycarbonate resin composition which can provide a sliding property of a molding product formed of a flame-retardant resin composition obtained by blending a polycarbonate resin and a styrene resin with a phosphate ester compound and having a good flowability without decreasing an appearance of a molding product. The invention relates to a flame-retardant polycarbonate resin composition including 100 parts by weight of a resin composed of (A) from 60 to 99% by weight of a polycarbonate resin and (B) from 40 to 1% by weight of a styrene resin, (C) from 1 to 30 parts by weight of a phosphate ester compound and (D) from 0.3 to 3 parts by weight of a silicone oil having a viscosity of from 1,000 to 20,000 cs.

15 Claims, No Drawings

FLAME-RETARDANT POLYCARBONATE RESIN COMPOSITION AND ITS MOLDINGS

FIELD OF THE INVENTION

The present invention relates to a polycarbonate resin composition. More specifically, it relates to a flame-retardant polycarbonate resin composition which has an excellent flame retardance and, an excellent moldability and an impact resistance, which exhibits an excellent appearance of a molding product and a sliding property and which is used in an office automation equipment and home electric appliances through injection molding, and to a molding product formed of this composition.

DESCRIPTION OF THE RELATED ART

As having the advantages of impact resistance, heat resistance and good electric properties, polycarbonate resins have many applications in various fields of, for example, office automation appliances, information and communication appliances, electric and electronic appliances, car parts and building materials. However, there are some problems with polycarbonate resins in that they require high molding and working temperatures and their melt fluidity is low.

On the other hand, moldings for parts and housings for office automation appliances such as duplicators and facsimiles and for other electric and electronic appliances such as those mentioned above shall have a complicated shape with local projections or depressions, for example, having ribs or bosses therewith, and are required to be lightweight and thin-walled from the viewpoint of resources saving. Therefore, desired are polycarbonate resin compositions having increased melt fluidity, or that is, having increased injection moldability.

On the other hand, compositions of polycarbonate resins to which are added styrene resins such as acrylonitrile-butadiene-styrene resins (ABS resins), acrylonitrile-styrene resins (AS resins) and the like are known as polymer alloys, and have many applications in the field of moldings as having good heat resistance and impact resistance. As a rule, polycarbonate resins are self-extinguishable. However, some of their applications to office automation appliances, electric and electronic appliances and others require high-level flame retardancy.

To meet the requirements as above, various methods have heretofore been proposed. Concretely, JP-A 61-55145 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. JP-A 2-32154 discloses a molding polycarbonate composition with high flame retardancy and high impact resistance, comprising (A) an aromatic polycarbonate resin, (B) an ABS resin, (C) an AS resin, (D) a phosphate, and (E) a polytetrafluoroethylene component.

Meanwhile, a polycarbonate resin is sometimes inferior to a nylon resin and a polyacetal resin in the sliding property and the abrasion resistance, and it cannot be used in sliding parts and bearings. In order to improve the sliding property of a polycarbonate resin molding product, a method of coating a grease or an oil has been so far employed. This method is however problematic in that the coating of a grease or an oil is needed, fine particles have adverse effects such as contamination of other parts and the sliding property changes over the course of time. For this reason, it has been required to improve the sliding property of the polycarbonate resin itself.

As a method of improving the sliding property of a polycarbonate resin, (1) there is generally a method in which a polycarbonate resin is blended with polytetrafluoroethylene. However, the melting point is high, the pulverization is required, and the cost is high. Accordingly, this compound is used in a small amount. When the amount thereof is increased, the surface of the molding product is sometimes worsened, and the sliding property is not necessarily improved. (2) In a method in which a polycarbonate resin is blended with a lubricant such as a polyethylene wax, a liquid paraffin, a higher fatty acid, a fatty acid amide or an ester of a fatty acid and an alcohol, the addition of a relatively large amount of the lubricant is required, and a problem of bleed-out sometimes occurs.

Further, (3) JP-A-60-144351 and JP-A-1-259059 disclose a method in which a polycarbonate resin is blended with ultrahigh-molecular-weight polyethylene having a viscosity average molecular weight of 1,000,000 or more singly or in combination with polytetrafluoroethylene. In this method, however, polyethylene is, in some cases, not melted, a dispersibility is poor, and a molding product has hardly a good surface. Still further, JP-A-9-279006 discloses a slidable resin composition comprising a polytetrafluoroethylene resin, a polyethylene resin having a viscosity average molecular weight of from 1,000 to 10,000, a flaky inorganic filler, a composite rubber graft copolymer and a flame retardant. These techniques use the polyethylene resin. However, either of polytetrafluoroethylene and ultrahigh-molecular-weight polyethylene resins is used, and problems derived from these resins still remain.

In addition, a composition containing a silicone compound has been known. For example, (4) JP-A-8-12868 discloses a thermoplastic resin composition obtained by blending. 100 parts by weight of a resin composition comprising (A) an aromatic polycarbonate, (B) an ABS resin and/or (C) an AS resin with (D) from 0.01 to 5 parts by weight of a fluororesin and/or a silicone and (E) from 1 to 40 parts by weight of a specific phosphate ester compound. Further, JP-A-8-295796 discloses a flame-retardant resin composition comprising (A) a thermoplastic resin containing from 99 to 5% by weight of a specific polycarbonate resin and from 1 to 95% by weight of the other resin such as ABS, (B) a phosphorus compound, (C) at least one type selected from a silicone, a fluororesin and a phenolic resin. However, the silicones in these documents are identified to be the same type of the additive as the other fluororesin, and used for imparting the flame retardance. Besides, an oil having a number average molecular weight of from several hundreds to several millions, a gum, a varnish, a powder and pellets are only shown as the silicones. So long as the silicone oil is concerned, only a silicone oil having a viscosity of 30,000 cs is demonstrated in Examples.

Moreover, (5) JP-A-10-101920 discloses a resin composition comprising (A) from 30 to 90% by weight of a specific polycarbonate resin, (B) from 1 to 50% by weight of an ABS resin and (C) from 0.5 to 30% by weight of a substance selected from the group consisting of a low-molecular polyolefin, a silicone oil and silicone resin fine particles, and a slidable composition further comprising from 1 to 30% by weight of a phosphate ester compound. However, the silicones disclosed in these documents are silicone resin oils and silicone fine particles, and the use of optional silicones is only disclosed. Further, in Examples, silicone oils and silicone resin fine particles are demonstrated, and these are described to be substantially the same with respect to the effect of the sliding property.

SUMMARY OF THE INVENTION

It is an object of the invention to provide, under these circumstances, a flame-retardant polycarbonate resin composition in which when improving the sliding property in the molding of a thin and complicated polycarbonate resin molding product which is used in an office automation equipment, information and communication appliances, electric and electronic appliances, home electric appliances and automobiles, the appearance and the sliding property of the molding product being practically most important are both satisfied and a molding product using this composition.

In order to achieve the object of the invention, the present inventors have assiduously conducted investigations on the improvement of the sliding property of a flame-retardant polycarbonate resin composition obtained by blending a resin composed of a polycarbonate resin and a styrene resin and having a good flowability with a phosphate ester compound. Consequently, they have found that these problems can be solved by selectively using a specific silicone. This finding has led to the completion of the invention.

That is, the invention includes the following.

(1) A flame-retardant polycarbonate resin composition comprising 100 parts by weight of a resin composed of (A) from 60 to 99% by weight of a polycarbonate resin and (B) from 40 to 1% by weight of a styrene resin, (C) from 1 to 30 parts by weight of a phosphate ester compound and (D) from 0.3 to 3 parts by weight of a silicone oil having a viscosity of from 1,000 to 20,000 cs.

(2) The flame-retardant polycarbonate resin composition as recited in (1), wherein the resin composed of (A) and (B) contains 4% by weight or less of a rubber component.

(3) The flame-retardant polycarbonate resin composition as recited in (1) or (2), which further comprises from 0.05 to 5 parts by weight, per 100 parts by weight of the resin composed of (A) and (B), of (E) a fluoroolefin resin.

(4) The flame-retardant polycarbonate resin composition as recited in any one of (1) to (3), which further comprises from 0.5 to 30 parts by weight, per 100 parts by weight of the resin composed of (A) and (B), of (F) a composite rubber graft copolymer obtained by graft-polymerizing a composite rubber composed of a polyorganosiloxane and a polyalkyl (meth) acrylate with a vinyl monomer.

(5) A molding product which is formed of the flame-retardant polycarbonate resin composition as recited in any one of (1) to (4).

(6) A molding product for sliding which is formed of the flame-retardant polycarbonate resin composition as recited in any one of (1) to (4).

(7) A CD tray or a CRT monitor rotary bearing which is formed of the flame-retardant polycarbonate resin composition as recited in any one of (1) to (4).

DETAILED DESCRIPTION OF THE INVENTION

First, components (A) to (D) constituting the flame-retardant polycarbonate resin composition of the invention are described below.

(A) Polycarbonate Resin (PC):

The polycarbonate resin serving as the component (A) in the resin composition is not specifically defined, and may be any and every one known in the art. Generally used are aromatic polycarbonates to be produced from diphenols and carbonate precursors. For example, used are polycarbonates as produced by reacting a diphenol and a polycarbonate precursor in a solution method or in a melt method, such as those as produced through reaction of a diphenol and phosgene or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis(4-hydroxyphenyl) sulfoxide, bis(4-hydroxyphenyl) ether, bis(4-hydroxyphenyl) ketone, etc.

As the diphenols for use herein, preferred are bis (hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethyl carbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α,α',α"-tris(4-hyroxyphenyl)-1,3,5-triisopropylbenzene, phloroglucine, trimellitic acid, isatin-bis(o-cresol), etc. For controlling the molecular weight of the polycarbonate resin, employable are phenol, p-t-butylphenol, p-t-octylphenol, p-cumylphenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

In view of its mechanical strength and moldability, the polycarbonate resin to be the component (A) in the invention preferably has a viscosity-average molecular weight of from 10,000 to 100,000, more preferably from 14,000 to 40,000, furthermore preferably from 16,000 to 30,000. In view of protecting the environment, it is desirable that the polycarbonate resin constituting the composition does not have a halogen in its structure.

(B) Styrenic Resin:

The styrenic resin to be the component (B) in the resin composition of the invention may be a polymer as prepared through polymerization of a monomer or monomer mixture of from 20 to 100% by weight of amonovinylic aromatic monomer such as styrene, α-methylstyrene or the like, from 0 to 60% by weight of a vinyl cyanide-type monomer such as acrylonitrile, methacrylonitrile or the like, and from 0 to 50% by weight of any other vinylic monomer copolymerizable with those monomers, such as maleimide, methyl (meth)acrylate or the like. The polymer includes, for example, polystyrenes (GPPS), acrylonitrile-styrene copolymers (AS resins), etc.

As the styrenic resin, also preferably used herein are rubber-like polymer-modified styrenic resins. The modified styrenic resins are preferably impact-resistant styrenic resins as produced through grafting polymerization of rubber-like polymers with styrenic monomers. The rubber-modified styrenic resins include, for example, impact-resistant polystyrenes (HIPS) as produced through additional polymerization of rubber-like polymers such as polybutadiene or the like with styrene; ABS resins as produced through additional polymerization of polybutadiene with acrylonitrile and styrene; MBS resins as produced through additional polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of the rubber-like polymer to modify them may fall, for example, between 2 and 30% by weight, but preferably between 3 and 20% by weight, furthermore, especially in the view of the sliding property, preferably between 4 and 15% by weight. If the amount of the modifying rubber-like polymer is smaller than 2% by weight, the resin composition will have poor impact resistance. If, on the other hand, it is larger than 30% by weight, the thermal stability of the resin composition will be lowered, and the melt fluidity thereof will be also lowered. If so, the resin composition will be unfavorably gelled or yellowed, furthermore, the sliding property are sometimes decreased. Specific examples of the rubber-like polymer include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, etc.

Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

The flame-retardant polycarbonate resin composition of the invention is to improve the melt flowability of the resin composition by blending a polycarbonate resin with a styrene resin. The proportions of both of the resins are that polycarbonate resin (A) is between 60 and 99% by weight, preferably between 70 and 97% by weight and styrene resin (B) is between 40 and 1% by weight, preferably between 30 and 3% by weight. When polycarbonate resin (A) is less than 60% by weight, the heat resistance, the strength and the sliding property are unsatisfactory. When styrene resin (B) is less than 1% by weight, the effect of improving the moldability is unsatisfactory. In this case, as this styrene resin (B), the above-mentioned rubber-modified styrene resin is preferably used. Further, the content of the rubber component in the resin composed of (A) and (B) is 4% by weightor less, preferably 3.5% by weight or less, especially preferably 3% by weight or less. When the rubber content exceeds 4% by weight, the sliding property becomes poor, and the surface property and the sliding property are sometimes decreased in the repetitive sliding in particular.

These amounts are determined, as required, in consideration of the molecular weight of the polycarbonate resin, the type, the molecular weight and the melt index of the styrene resin, the rubber content, and the use, the size and the thickness of the molding product.

(C) Phosphate Ester Compounds

In this invention, preferred are the halogen-free phosphate ester compounds. For example, preferred are phosphate ester compounds of the following formula (1):

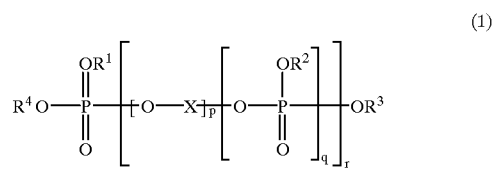

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups, etc. The substituents for the substituted groups include, for example, alkyl groups, alkoxy groups, aryl groups, aryloxy groups, arylthio groups, etc. These substituents may be combined to give arylalkoxyalkyl groups, or may be bonded, for example, via oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, groups as derived from bisphenols of polycyclic phenols.

Preferred are groups derived from bisphenol A, hydroquinone, resorcinol, diphenylolmethane, dihydroxydiphenyl, dihydroxynaphthalene, etc.

The halogen-free phosphate ester compounds may be monomers, oligomers, polymers or their mixtures. Concretely, they include, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphsophate, cresyldiphenyl phosphate, etc.

Commercially-available, halogen-free phosphates that are preferably used as the component (C) are, for example, TPP [triphenyl phosphate], TXP [trixylenyl phosphate], PFR [resorcinol(diphenyl phosphate)], PX200 [1,3-phenylene-tetrakis(2,6-dimethylphenyl) phosphate], PX201 [1,4-phenylene-tetrakis(2,6-dimethylphenyl) phosphate], PX202 [4,4'-biphenylene-tetrakis(2,6-dimethylphenyl) phosphate], CR733S [phenylresorcinol polyphosphate], all from Daihachi Chemical Industry.

The content of phosphate ester compound (C) is between 1 and 30 parts by weight, preferably between 3 and 20 parts by weight, more preferably between 5 and 15 parts by weight per 100 parts by weight of the resin composed of polycarbonate resin (A) and styrene resin (B). When the content is less than 1 part by weight, the flame retardance of the molding product is unsatisfactory. When it exceeds 30 parts by weight, the heat resistance and the impact resistance of the molding product are sometimes decreased.

(D) Silicone Oil

Silicone oil (D) used in the invention has a viscosity of from 1,000 to 20,000 Cs, preferably from 2,000 to 15,000 cs. When the viscosity of the silicone oil is less than 1,000 cs, the effect of decreasing the coefficient of friction is low. Further, when it exceeds 20,000 cs, the sliding property can be improved, but the appearance of the molding product is poor. Thus, the product can hardly become a commercial product, and the level of the flame retardance is decreased.

The silicone oil here referred to is apolyorganosiloxane. Examples thereof include a dimethylsiloxane polymer, a methylethylsiloxane polymer, a methylpropylsiloxane polymer, a diphenylsiloxane polymer, a phenylmethylsiloxane polymer and a copolymer thereof. Further, in these silicone oils, the side chain which is an end of the molecular structure may be substituted with an epoxy group, a hydroxyl group, a carboxyl group, an amino group, a mercapto group, an ether group or a hydrogen group.

The content of silicone oil (D) having the viscosity of from 1,000 to 20,000 Cs is between 0.3 and 3 parts by weight, preferably between 0.5 and 2 parts by weight per 100 parts by weight of the resin composed of polycarbonate resin (A) and styrene resin (B). When the content is less than 0.3 parts by weight, the sliding property of the molding product is unsatisfactory. When it exceeds 3 parts by weight, the appearance of the molding product is worsened, and the level of the flame retardance is decreased in some cases.

The invention can basically improve the sliding property with four components (A) to (D). The flame-retardant polycarbonate resin composition of the invention can further contain fluoroolefin resin (E) for preventing melt dropping in the combustion. An agent for preventing melt dropping in the combustion includes a fluoroolefin resin, a silicone resin, an inorganic whisker and an inorganic fiber which are known. The fluoroolefin resin is preferably used. The fluoroolefin resin (E) is a polymer having a fluoro-olefinic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD-076 (from Asahi ICI Fluoropolymers), etc.

Others except PTFE of Type 3 are also employable herein, including, for example, Argoflon F5 (from Montefluos), Polyflon MPA, FA-100 (both from Daikin Industry), etc. These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammoniumperoxydisulfide, under a pressure of from 1 to 100 psi, at a temperature falling between 0 and 200° C., preferably between 20 and 100° C.

The fluoroolefin resin content of the composition may fall between 0.05 and 5 parts by weight, but preferably between 0.1 and 2 parts by weight relative to 100 parts by weight of the resin mixture of (A) and (B). If the fluoroolefin resin content is smaller than 0.05 parts by weight, the resin melt-dropping preventing ability of the composition will be not enough for the intended flame retardancy of the composition. However, even if the content is larger than 5 parts by weight, the effect of the fluoroolefin resin added could not be augmented any more, and such a large amount of the fluoroolefin resin, if added to the composition, will have some negative influences on the impact resistance and the outward appearance of the moldings of the composition. Therefore, the amount of the fluoroolefin resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention can contain composite rubber graft copolymer (F) obtained by graft-polymerizing a composite rubber composed of a polyorganosiloxane and a polyalkyl (meth) acrylate with a vinyl monomer for improving the impact strength and further sliding property. This composite rubber graft copolymer is obtained by graft-polymerizing the composite rubber of the structure in which the polyorganosiloxane component and the polyalkyl (meth)acrylate rubber component are entangled with each other and conjugated with one or more vinyl monomers, and it is itself a known graft copolymer.

With respect to the two rubber components constituting the composite rubber, the amount of the polyorganopolysiloxane rubber component is between 1 and 99% by weight, and the amount of the polyalkyl (meth)acrylate component is between 99 and 1% by weight. The amount of the polyorganopolysiloxane rubber component is preferably between 30 and 95% by weight, more preferably between 50 and 90% by weight. Incidentally, it is reported that this composite rubber graft copolymer has itself an effect of improving the sliding property. From this point as well, the content of the polyorganopolysiloxane rubber component is considered to be preferably 50% by weight or more.

This composite rubber graft copolymer is produced by a known method. Generally, it is preferably produced by an emulsion polymerization method. In this method, a latex of a polyorganosiloxane gum is formed, a monomer for forming an alkyl (meth)acrylate rubber is dipped in the rubber particles of the polyorganosiloxane rubber latex, and the monomer for forming an alkyl (meth) acrylate rubber is then polymerized. The rubber component of the polyorganosiloxane rubber latex is prepared by the emulsion polymerization using 70% by weight or more of an organosiloxane such as hexamethylcyclotrisiloxane, octamethylcyclotetrasiloxane or decamethylcyclopentasiloxane and from 0.1 to 30% by weight of a trifunctional or tetrafunctional silane crosslinking agent such as trimethoxymethylsilane or tetraethoxysilane. At this time, a grafting agent such as methacryloyloxysiloxane or tetramethyltetravinylcyclotetrasiloxane can further be used in combination in an amount of from 0 to 10% by weight.

Next, the alkyl (meth)acrylate rubber component constituting the composite rubber component is formed by using a crosslinking agent and a grafting agent. The crosslinking agent includes alkyl (meth)acrylates such as alkyl acrylates, for example, methyl acrylate, ethyl acrylate and n-butyl acrylate, and alkyl methacrylates, for example, hexyl methacrylate and 2-ethylhexyl methacrylate and ethyiene glycol dimethacrylate. The grafting agent includes allyl methacrylate. The amounts of the crosslinking agent and the grafting agent are between 0.1 and 20% by weight.

With respect to the polymerization of this polyalkyl (meth)acrylate rubber, the alkyl (meth)acrylate, the crosslinking agent and the grafting agent are added to the latex of the polyorganosiloxane rubber component neutralized with the addition of an alkali aqueous solution, and dipped in the polyorganosiloxane rubber particles, and the polymerization is then conducted using a radical polymerization initiator. As the polymerization proceeds, the polyalkyl (meth)acrylate rubber crosslinked network mutually entangled with the polyorganosiloxane rubber crosslinked network is formed to obtain a composite rubber latex which cannot be separated substantially. The average particle diameter of this composite rubber is preferably in the range of from 0.08 to 0.6 μm.

Examples of the vinyl monomer to be graft-polymerized with this composite rubber include styrene compounds such as styrene, α-methylstyrene and vinyltoluene; methacrylate esters such as methyl methacrylate and 2-ethylhexyl methacrylate; acrylate esters such as methyl acrylate, ethyl acrylate and butyl acrylate; and vinyl cyanide compounds such as acrylonitrile and methacrylonitrile. Of these vinyl monomers, methyl methacrylate is preferably used. The amount of the vinyl monomer is between 90 and 5% by weight relative to between 10 and 95% by weight of the composite rubber, preferably between 70 and 10% by weight relative to between 30 and 90% by weight of the composite rubber.

When the amount of the vinyl monomer is outside this range, the dispersibility and the moldability are decreased, and the sliding property is unsatisfactory. The composite rubber graft copolymer is formed by adding the vinyl monomer to the latex of the composite rubber and conducting the radical polymerization at one or two steps. Such a specific composite rubber graft copolymer is on the market as Metaprene S-2001 supplied by Mitsubishi Rayon Co., Ltd.

The content of specific composite rubber graft copolymer (F) is between 0.5 and 30 parts by weight, preferably between 1 and 20 parts by weight, especially preferably between 2 and 15 parts by weight per 100 parts by weight of the resin composed of (A) and (B). When it is less than 0.5 parts by weight, the impact resistance and the effect of improving the sliding property are unsatisfactory. When it exceeds 30 parts by weight, the heat resistance and the rigidity are sometimes decreased. This content is generally determined on the basis of the type of the phosphate ester compound or the styrene resin as the flame retardant and the content of the inorganic filler in consideration of the properties required for the molding product.

The flame-retardant polycarbonate resin composition of the invention further contains, as required, an epoxy group-containing compound in a small amount of from 0.1 to 10 parts by weight per 100 parts by weight of the resin composed of (A) and (B), making it possible to improve the heat stability in the molding. The above epoxy group-containing compound is a compound having at least one or more epoxy groups in the molecule. Preferably, it does not have a halogen.

Concretely, it includes, for example, epoxidized soybean oil, epoxidized linseed oil, epoxybutyl stearate, epoxyacryl stearate, phenyl glycidyl ether, allyl glycidyl ether, p-butylphenyl glycidyl ether, styrene oxide, neohexene oxide, diglycidyl adipate, diglycidyl sebacate, diglycidyl phthalate, bis-epoxydicyclopentadienyl ether, ethylene glycol diglycidyl ether, propylene glycol diglycidyl ether, polyethylene glycol diglycidyl ether, butadiene diepoxide, tetraphenylethylene epoxide, epoxidated polybutadiene, bisphenol A-type epoxy compounds, bisphenol S-type epoxy compounds, phenol-novolak-type epoxy compounds, resorcinol-type epoxy compounds, as well as epoxy-modified block copolymer such as epoxidated styrene-butadiene copolymer, epoxidated hydrogenated styrene-butadiene copolymer. These may be used either singly or as combined. The epoxy-modified block copolymer is on the market as "SBS A1020" or "SEBS 420" supplied by Daicel Chemical Industries, Ltd.

The optional component (G), inorganic filler that may be in the flame-retardant polycarbonate composition of the invention is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially available products of it are employable herein. The inorganic filler such as talc for use in the invention generally has a mean grain size of from 0.1 to 50 μm, but preferably from 0.2 to 20 μm. Containing the inorganic filler as above, especially talc, the rigidity of the moldings of the invention is further increased and, in addition, the amount of the flame retardant, halogen-free phosphate to be in the composition could be reduced.

The amount of the component (G), inorganic filler that may be in the composition of the invention may fall between 1 to 100 parts by weight, but preferably between 2 and 50 parts by weight, relative to 100 parts by weight of the resin mixture of (A) and (B). If its amount is smaller than 1 part by weight, the inorganic filler added could not satisfactorily exhibit its effect of improving the rigidity and the flame retardancy of the moldings of the composition. However, if the amount is larger than 100 parts by weight, the impact resistance of the moldings will lower and the melt fluidity of the composition will lower. The amount of the inorganic filler to be in the composition shall be suitably determined, depending on the necessary properties of the moldings and the moldability of the composition, especially on the thickness of the moldings and the spiral flow length of the composition.

Apart from the essential components (A), (B), (C) and (D) and one or more optional components selected from (E) to (G), the flame-retardant polycarbonate resin composition of the invention may additionally contain any other additives which are generally added to ordinary thermoplastic resins, if desired. The additives are for further improving the moldability, the outward appearance, the weather resistance and the rigidity of the moldings of the composition.

For example, the additives include phenol type antioxidant, phosphorous containing antioxidant, sulfur containing antioxidant, antistatic agents, polyamide-polyether block copolymers (for permanent static electrification resistance), benzotriazole-type or benzophenone-type UV absorbents, hindered amine-type light stabilizers (weatherproofing agents), microbicides, compatibilizers, colorants (dyes, pigments), etc. The amount of the optional additive that may be in the thermoplastic resin composition of the invention is not specifically defined, provided that it does not interfere with the properties of the composition.

The method for producing the flame-retardant polycarbonate resin composition of the invention is described. The composition may be produced by mixing and kneading the components (A), (B), (C) and (D) in a predetermined ratio as above, optionally along with the optional components (B) and (E) to (G) and with additives as above in any desired ratio.

Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a cokneader or the like. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the resin composition of the invention may be molded into various moldings in the melt-molding devices as above, or, after it is pelletized, the resulting pellets may be molded into various moldings through injection molding, injection compression molding, extrusion molding, blow molding, press molding, vacuum molding of foaming. Preferably, the composition is pelletized in the melt-kneading manner as above, and the resulting pellets are molded into moldings through injection molding or injection compression molding. The composition of the invention is especially favorable to such injection molding or injection compression molding, as the mold releasability of the resulting moldings is good. For injection molding of the composition, preferred is a gas-introducing molding method so as to prevent shrinkage cavity around the moldings and to reduce the weight of the moldings.

The injection molding product (including an injection compression product) obtained from the flame-retardant polycarbonate resin composition of the invention is used in the fields of a housing or various parts of an office automation equipment, information appliances, electric and electronic appliances and home electric appliances such as a copier, a fax, a personal computer, a printer, a television set, a radio set, a tape recorder, a video deck, a telephone, an information terminal, a refrigerator and an electronic oven, and further in other fields of automobile parts. Especially, it is preferably used in a CD (compact disk) tray and rotary bearing parts of CRT (cathode-ray tube, ordinary braun tube) monitor, which are slidable parts.

The invention is described in more detail with reference to the following Examples and Comparative Examples, which, however, are not intended to restrict the scope of the invention. Examples 1 to 3, and Comparative Examples 1 to 4:

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba Speciality Chemicals) and 0.1 parts by weight of Irgafos 168 (from Ciba Speciality Chemicals) serving as, both serving as an antioxidant. The resulting pellets were dried at 80° C. for 12 hours, and then molded into test pieces through injection molding at 260° C. These test pieces and CD tray (about 180 mm×120 mm) were tested for their properties, and their data obtained are shown in Table 1.

The materials used for producing the test samples, and the methods for testing the samples are mentioned below.

(A) Polycarbonate: Toughlon A1900 (from Idemitsu Petrochemical).

This is a bisphenol Apolycarbonate resin having a melt index (MI) of 20 g/10 min (at 280° C., under a load of 2.16 kg), and a viscosity-average molecular weight of 19000.

(B) Styrenic Resin (impact-resistant polystyrene resin, HIPS): Idemitsu PS IT44 (from Idemitsu Petrochemical).

This is a polystyrene-grafted polybutadiene (rubber-like elastomer) of which the rubber-like elastomer content is 10% by weight, and this has MI of 8 g/10 min (at 200° C., under a load of 5 kg).

(C) Phosphate Ester Compounds

P-1: Triphenyl phosphate, TPP (from Daihachi Chemical).

P-2: Resorcinol bis(diphenyl phosphate), Phosphate PFR (from Asahi Denka Kogyo).

(D) Silicone Oil

S-1: viscocity=5,000 Cs

S-2: viscocity=12,500 cs

S-3: viscocity=350 cs

S-4: viscocity=30,000 cs (TSF451: from Toshiba Silicone)

(E) Fuluoroolefin Resin

Polytetrafluoroethylene (PTFE), F201L (from Daikin Chemical Industry) having a molecular weight of from 4,000,000 to 5,000,000.

(F) Composite Rubber Graft Copolymer:

Metablen S2001 (from Mitsubishi Rayon).

This is a composite rubber-grafted copolymer having a polydimethylsiloxane content of at least 50% by weight.

(G) Inorganic Filler

Talc: FFR (from Asada Flour Milling), having a mean grain size of 0.7 $\mu$m.

[Methods of evaluating properties]

(1) Appearance of a Molding Product

A molding product of a CD tray was visually observed.

(2) Izod Impact Strength:

Measured according to ASTMD 256. Thetemperaturewas23° C., and the thickness of samples was ⅛ inches. The data are in terms of kJ/m$^2$.

(3) Sliding Property

The sliding property was measured according to the A method of JIS K 7218 (test method of measuring sliding abrasion of plastics) using disk test pieces obtained from the compositions of Examples and Comparative Examples and hollow cylindrical test pieces obtained from the composition of Comparative Example 1. The plate-like test pieces were rotated under a load of 2 kg. At this time, the maximum frictional force occurring in the contact surfaces of the disk and cylindrical test pieces was measured for 5 minutes, and the average value (kg) was obtained. It was evaluated in terms of coefficient of friction=frictional force (kg)/load (2 kg).

(4) Flame Retardance

Measured by the UL-94 combustion test (thickness of the test piece: 1.5 mm).

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| Formulation | (A) | PC | 80 | 80 | 75 | 80 | 80 | 80 | 80 |
| | (B) | HIPS | 20 | 20 | 25 | 20 | 20 | 20 | 20 |
| | (C) | P-1 | 10 | — | — | — | — | — | — |
| | | P-2 | — | 10 | 10 | 10 | 10 | 10 | 10 |
| | (D) | S-1: 5,000 cs | 2 | — | 1 | — | — | — | — |
| | | S-2: 12,500 cs | — | 1.5 | — | — | — | — | 4.0 |
| | | S-3: 350 cs | — | — | — | — | 1.5 | — | — |
| | | S-4: 30,000 cs | — | — | — | — | — | 1.5 | — |
| | (E) | PTFE | — | 0.3 | 0.3 | 0.3 | 0.3 | 0.3 | 0.3 |
| | (F) | composite rubber graft copolymer | — | 5 | 5 | 5 | 5 | 5 | 5 |
| | (G) | talc | — | — | 10 | — | — | — | — |
| Evaluation | (1) | Appearance of a molding product | ○ | ○ | ○ | ○ | ○ | x | x |
| | (2) | Izod impact strength (kj/cm$^2$) | 40 | 60 | 50 | 65 | 35 | 60 | 55 |
| | (3) | Coefficient of friction | 0.25 | 0.30 | 0.35 | 0.55 | 0.45 | 0.30 | 0.20 |
| | (4) | UL-94 (thickness: 1.5 mm) | V-2 | V-0 | V-0 | V-0 | V-0 | V-1 | V-2 |

Ex. - Example, CEx. - Comparative Example

The results in Table 1 reveal that the molding product obtained from the flame-retardant polycarbonate resin composition of the invention can improve the sliding property without occurrence of poor appearance. Further, the unexpected effect of improving the flame retardance is clearly provided in Example 2 in comparison with Comparative Examples 3 and 4.

INDUSTRIAL AVAILABILITY

A flame-retardant polycarbonate resin composition of the invention is obtained by blending a polycarbonate resin with a styrene resin and a phosphate ester compound, whereby a sliding property can be achieved in a flame-retardant polycarbonate resin having a good moldability without providing a poor appearance of a molding product and decreasing a flame retardance. Accordingly, it can be adapted well to the increase in the size and the decrease in the thickness in an office automation equipment, information and communication appliances, electric and electronic appliances, home electric appliances and automobile parts, and the application fields are expected to be widened. Since this flame-retardant polycarbonate resin composition is excellent in sliding property and flame retardance in particular, it can preferably be used in parts that undergo friction owing to the sliding, for example, a CD tray and a CRT monitor rotary bearing.

What is claimed is:

1. A flame-retardant polycarbonate resin composition comprising 100 parts by weight of a resin composed of (A) from 60 to 99% by weight of a polycarbonate resin and (B) from 40 to 1% by weight of a styrene resin, (C) from 1 to 30 parts by weight of a phosphate ester compound and (D) from 0.3 to 3 parts by weight of a silicone oil having a viscosity of from 2,000 to 15,000 cs.

2. The flame-retardant polycarbonate resin composition as claimed in claim 1, wherein the resin composed of (A) and (B) contains 4% by weight or less of a rubber component.

3. The flame-retardant polycarbonate resin composition as claimed in claim 1 or 2, which further comprises from 0.05 to 5 parts by weight, per 100 parts by weight of the resin composed of (A) and (B), of (E) a fluoroolefin resin.

4. The flame-retardant polycarbonate resin composition as claimed in claim 1 or 2, which further comprises 0.5 to 30 parts by weight, per 100 parts by weight of the resin composed of (A) and (B), of (F) a composite rubber graft copolymer obtained by graft-polymerizing a composite rubber composed of a polyorganosiloxane and a polyalkyl (meth)acrylate with a vinyl monomer.

5. A molding product which is formed of the flame-retardant polycarbonate resin composition as claimed in claim 1 or 2.

6. A molding product for sliding which is formed of the flame-retardant polycarbonate resin composition as claimed in claim 1 or 2.

7. A CD tray or a CRT monitor rotary bearing which is formed of the flame-retardant polycarbonate resin composition as claimed in claim 1 or 2.

8. The flame-retardant polycarbonate resin composition as claimed in claim 3, which further comprises from 0.5 to 30 parts by weight, per 100 parts by weight of the resin composed of (A) and (B), of (F) a composite rubber graft copolymer obtained by graft-polymerizing a composite rubber composed of a polyorganosiloxane and a polyalkyl (meth)acrylate with a vinyl monomer.

9. A molding product which is formed of the flame-retardant polycarbonate resin composition as claimed in claim 3.

10. A molding product for sliding which is formed of the flame-retardant polycarbonate resin composition as claimed in claim 3.

11. A CD tray or a CRT monitor rotary bearing which is formed of the flame-retardant polycarbonate resin composition as claimed in claim 3.

12. A molding product which is formed of the flame-retardant polycarbonate resin composition as claimed in claim 4.

13. A molding product for sliding which is formed of the flame-retardant polycarbonate resin composition as claimed in claim 4.

14. A CD tray or a CRT monitor rotary bearing which is formed of the flame-retardant polycarbonate resin composition as claimed in claim 4.

15. A resin composition as claimed in claim 1, wherein said silicone oil has a viscosity of from 5,000 to 12,500 cs.

* * * * *